United States Patent Office 2,865,915
Patented Dec. 23, 1958

2,865,915
17α,21-OXIDES OF 1,4-PREGNADIENE COMPOUNDS

George A. Bailey, Roselle, and Ralph F. Hirschmann, Westfield, N. J., assignors to Merck & Co., Inc., Rahway, N. J., a corporation of New Jersey No Drawing. Application September 20, 1956
Serial No. 610,888

4 Claims. (Cl. 260—239.55)

This invention relates to steroids and particularly to novel compounds having cortisone-like activity.

According to the present invention, there are produced novel 17α,21-oxides of 1,4-pregnadiene compounds having cortisone-like anti-inflammatory activity. These are 11β-hydroxy-3,20-diketo-1,4-pregnadiene-17α,21-oxide and 3,11,20-triketo-1,4-pregnadiene-17α,21-oxide. These compounds may be represented by the following structural formula:

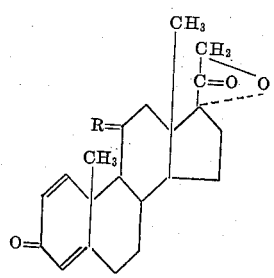

where R is selected from the group consisting of keto (O=) and hydroxyl

The therapeutic activity of the 17α,21-oxides according to this invention is surprising in view of the fact that the compounds 11β-hydroxy-3,20-diketo-4-pregnene-17α,21-oxide (hydrocortisone oxide) and 3,11,20-triketo-4-pregnene-17α,21-oxide (cortisone oxide) possess so little cortisone-like activity as to be useless for this purpose.

An advantage of the compounds of the present invention is the virtual absence of undesirable side effects which have been observed in previously known compounds possessing cortisone-like activity. These compounds have virtually no effect on sodium retention in patients, and gastric acid secretion remains within safe limits.

The compounds according to the present invention can be prepared by reaction of the corresponding 21-halo compounds, where the 21-halo atom has an atomic weight of at least 35 (that is, either chlorine, bromine, or iodine) with a silver salt, silver oxide or silver hydroxide in a suitable liquid medium. An organic liquid medium such as acetonitrile, tetrahydrofuran, or diethyl ether is preferred. The reaction may be represented by the following equation:

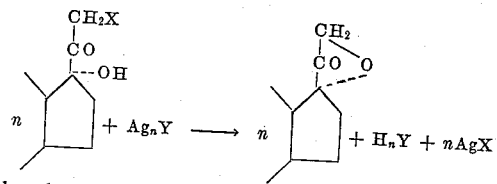

In the above equation, X represents either chlorine, bromine, or iodine, and Y represents a cationic element or radical having a valence n. The 21-iodo steroid compounds are preferred, although the 21-chloro- and 21-bromo-compounds are also suitable reagents. Only the D ring has been shown in the above equation as the substituents on the A, B and C rings remain unchanged and do not affect the course of the reaction.

Various silver salts may be used in preparing the 17α,21-oxides of this invention. Among these are silver phosphate, silver sulfate, and silver carbonate. Silver oxide and silver hydroxide may also be used. Silver phosphate may be mixed with phosphoric acid in carrying out the reaction with the 21-iodo-pregnene compound.

This invention will now be described by reference to the following examples.

Example 1

A mixture of 25.9 g. of 21-iodo-11β,17α-dihydroxy-3,20-diketo-1,4-pregnadiene and 66.8 g. of silver carbonate in 500 ml. of acetonitrile are refluxed with constant stirring in a nitrogen atmosphere for about two hours. The product is filtered, and a finely divided diatomaceous earth filter aid is present to facilitate filtration. The filter cake is washed with hot acetonitrile, and the combined filtrate and washes are treated with 2 g. of decolorizing charcoal. The acetonitrile is evaporated and 500 ml. of chloroform are added to dissolve the crude steroid 17,21-oxide product. The solution is passed through a column containing 520 g. of alumina to adsorb the oxide, which is eluted with 4 liters of chloroform. The chloroform is evaporated, and the product, 11β-hydroxy-3,20-diketo-1,4-pregnadiene-17α,21-oxide (prednisolone oxide) is recrystallized from an acetone-n-hexane mixture. The melting point is 242° to 244° C. Other properties:

$\lambda_{max.}^{MeOH}$ 242 mμ. E% 443

*Analysis.*—Found: C, 73.84; H, 7.74.

Example 2

A mixture of 1.379 liters of 85% phosphoric acid and 3.36 kg. of trisilver phosphate is prepared in a 30-gallon stainless steel vessel with vigorous agitation by means of a scraper agitator. Then 42 liters of acetonitrile are added and the mixture is vigorously agitated simultaneously with a turbine agitator and a concentric scraper agitator. The air is purged from the vessel under vacuum and a flowing nitrogen atmosphere is introduced in place of the air. To the vessel are added 1.05 kg. of 21-iodo-11β,17α-dihydroxy-3,20-diketo-1,4-pregnadiene. The mixture is refluxed for 1¼ hours in a nitrogen atmosphere and then is cooled to 25° to 30° C. Then 7 kg. of ice and 6.1 liters of water are added to the vessel and the slurry is removed from the vessel. The vessel is rinsed with 6 liters of acetonitrile in three equal portions and the rinsings are combined with the slurry.

The acetonitrile is evaporated under high vacuum at a temperature below 30° C. leaving a water suspension. The pH of the suspension is adjusted to 6.8 to 7 by the addition of 34% aqueous sodium hydroxide solution. To the suspension are added 400 g. of a finely divided diatomaceous earth filter aid and the slurry is filtered. The filter cake is washed with water until the washings contain no ultra-violet absorbing material. The cake, which weighs approximately 10.5 kg., is extracted with acetone until no ultra-violet absorbing material is observed. This requires five extractions and a total of 44 pounds of acetone. Both prednisolone 17α,21-oxide and unreacted 21-iodo-prednisolone are dissolved. The volume of liquid is reduced to 20 gallon by high vacuum evaporation. Then 210 g. of decolorizing charcoal are added and the slurry is filtered. The filter cake is washed with acetone, which is combined with the filtrate. The filtrate is concentrated under high vacuum to a small volume at which time the formation of crystals is observed. Then 21 liters of deionized water are added and the acetone is evaporated under high vacuum. The aqueous suspension remaining is cooled to 5° C., filtered, and washed with two portions of water of two liters each. The filter cake is dried.

The dried material is slurried in 10 liters of benzene and the insoluble material is filtered off. The filter cake is washed with benzene which is added to the filtrate. The benzene solution is then passed through a column of 20 pounds of chromatographic grade alumina. The column is eluted with 30 g. of a mixture of 50% by volume benzene and 50% chloroform. The eluate is spot-checked periodically for the presence of crystalline material and the addition of benzene-chloroform eluant is stopped when no crystalline material is observed. The eluant is concentrated to 7 liters, transferred to a 12-liter flask, and concentrated to near dryness with the formation of crystals. The crystals are dissolved in 2 liters of acetone and 15 g. of decolorizing charcoal are added and the lurry is filtered and washed with acetone. The filtrate and washings are concentrated to 1.8 liters with the formation of well-defined crystals. Two liters of petroleum ether (boiling point range 60 to 70°) are added slowly and the mixture is cooled to 5° C. and filtered. The filter cake constitutes the first crop of crystals and the yield is 34.7 g. of pure 3,20-diketo-11β-hydroxy-1,4-pregnadiene-17α,21-oxide. A second crop of product weighing 10.2 g. is obtained by concentrating the mother liquid to 500 ml. adding 2 liters of diethyl ether and cooling.

*Example 3*

The procedure of Example 2 is followed except that an equivalent quantity of 21-iodo-17α-hydroxy-3,11,20-triketo-1,4-pregnadiene is reacted with the silver phosphate-phosphoric acid mixture. The product recovered is 3,11,20-triketo-1,4-pregnadiene-17α,21-oxide.

While the foregoing invention has been described with reference to specific details and embodiments thereof, it is understood that the scope of this invention is measured only by the scope of the appended claims.

What is claimed is:
1. A compound having the formula

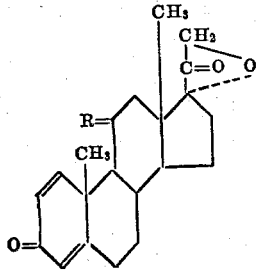

where R is selected from the group consisting of keto and β-hydroxyl.
2. 1,4-pregnadiene-11β-ol-3,20-dione-17α,21-oxide.
3. 1,4-pregnadiene-3,11,20-trione-17α,21-oxide.
4. A process for preparing a compound having a formula selected from the group consisting of

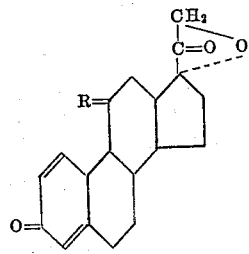

where R is selected from the group consisting of keto and β-hydroxyl, which comprises reacting the corresponding compound having the formula

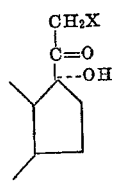

where X is a halogen having an atomic weight of at least 35, with a compound selected from the group consisting of inorganic silver salts, silver oxide, and silver hydroxide, and recovering the pregnene-17α,21-oxide from the water-insoluble products.

No references cited.